United States Patent [19]
Aikawa

[11] Patent Number: 5,884,774
[45] Date of Patent: Mar. 23, 1999

[54] PAPERMAKING SCREEN

[75] Inventor: Yoshihiko Aikawa, Shizuoka, Japan

[73] Assignee: Aikawa Iron Works Co., Ltd., Shizuoka, Japan

[21] Appl. No.: 798,473

[22] Filed: Feb. 10, 1997

[30] Foreign Application Priority Data

Mar. 11, 1996 [JP] Japan .................................. 8-052726

[51] Int. Cl.⁶ .................................................. B07B 1/04
[52] U.S. Cl. .......................... 209/273; 209/306; 210/414; 210/512.1
[58] Field of Search .................................... 209/273, 281, 209/283, 305, 306, 17; 210/413, 414, 415, 512.1

[56] References Cited

U.S. PATENT DOCUMENTS

| 5,318,186 | 6/1994 | Rienecker | 209/306 X |
| 5,587,073 | 12/1996 | Zittel | 209/290 X |
| 5,622,267 | 4/1997 | Hautala | 209/273 |

FOREIGN PATENT DOCUMENTS 6-40636  10/1994  Japan .

Primary Examiner—Tuan N. Nguyen
Attorney, Agent, or Firm—Kanesaka & Takeuchi

[57] ABSTRACT

A papermaking screen apparatus is formed of a tank, cylindrical first and second screens and a stirring unit, which are disposed inside the tank. The tank holds a papermaking material, and includes a papermaking material inlet at a peripheral portion and a screened material outlet for removing a screened material from a center portion of the tank. The first screen is situated inside the tank to form an inner compartment therein connected to the outlet. The second screen is situated inside the tank and located outside the first screen to thereby form an outer chamber between an inner periphery of the tank and the second screen, and an inner chamber between the first and second screens. The second screen is at least partly overlapped with the first screen along an axial direction. The stirring unit is rotatably situated inside the tank and includes a first stirrer situated in the inner chamber adjacent to the first screen, and a second stirrer situated in the outer chamber adjacent to the second screen. When the papermaking material is supplied from the inlet and the first and second stirrers are rotated, the papermaking material passes through the first and second screens and flows radially inwardly of the tank to be discharged from the outlet through the inner compartment.

7 Claims, 10 Drawing Sheets

PAPERMAKING SCREEN

BACKGROUND OF THE INVENTION

1. Field of the Invention

The present invention relates to a papermaking screen and, more particularly, to a papermaking screen which has a plurality of screens apparatus in a tank thereof.

2. Description of Related Art

Hitherto, there have been papermaking screens which have a plurality of screens in tanks thereof in order to ensure efficient separation of useful fibers and foreign substances (refer, for example, to the papermaking screen disclosed in Japanese Examined Utility Model Publication No. 6-40636 shown in FIG. 10).

In the conventional papermaking screen, a rotary agitator 6' is provided inside an outer cylindrical screen 4' to separate useful fibers and foreign substances while preventing, to a certain extent, the screen from clogging at the same time.

However, positive pressure and negative pressure are applied alternately by the agitator 6' on the papermaking material outlet side of the outer cylindrical screen 4' and therefore, sufficient pressure cannot be produced, causing the outer cylindrical screen 4' to be clogged easily.

Immediately after the agitator 6' passes, the area near an interstice which is composed of a round hole, slit, or the like is subject to negative pressure, causing foreign substances to be drawn toward an acceptor end, adding to the chance of the clogging of the outer cylindrical screen 4'. Furthermore, the agitator 6' rotates inside the outer cylindrical screen 4', so that the moving velocity of the papermaking material slows down when it flows along the outer surface of the outer cylindrical screen 4', presenting a problem of deteriorated dust removing effect. It should be noted that the velocity of papermaking material passing through a interstice which is composed of a round hole, slit, or the like is normally constant, and therefore, the dust removing effect is increased as the moving velocity of the papermaking material flowing along the outer surface of the screen increases. The conventional papermaking screen shown in FIG. 10 has an inlet 1' for a papermaking material, a screened material outlet 2', a tank 3', the outer cylindrical screen 4', a screen basket 5', the agitator 6', an agitator 7', tail discharge ports 8' and 9', a centrifugal cleaner 10', a material pre-screening compartment 11', a material compartment 12', a screening compartment 13', a material supply passage 14', a return passage 15', and a runner 16'.

SUMMARY OF THE INVENTION

Accordingly, an object of the present invention is to provide a papermaking screen which has solved the shortcoming with the prior art described above.

To this end, according to one aspect of the present invention, there is provided a papermaking screen equipped with: a tank for holding a papermaking material, and having a papermaking material inlet, a screened material outlet, a first foreign substance outlet, a second foreign substance outlet, and a dilution water supply port; a cylindrical first screen which is provided in the tank, which separates the interior of the tank into a primary compartment and a secondary compartment, and which has interstices formed by a round hole, slit, or the like; a second screen provided with an outer peripheral surface which has an interstice formed by a round hole, slit, or the like that is larger than that of the interstice of the first screen, an inner peripheral surface having a papermaking material port which admits the passage of the papermaking material, and a ceiling surface connecting the apex of the inner peripheral surface and the apex of the outer peripheral surface, and which is provided outside the cylindrical first screen; a rotary member which is rotatably provided in the vicinity of the ceiling surface of the second screen; a stirring unit which is equipped with a first stirrer which is suspended from the ceiling surface of the rotary member and opposed to the outer side of the first screen and a second stirrer which is suspended from the ceiling surface of the rotary member and opposed to the outer side of the outer peripheral surface of the second screen, and which stirs the papermaking material in the primary compartment; wherein the inlet and the first foreign substance outlet are communicated with a first chamber which is provided in the primary compartment and which is formed outside the second screen, the dilution water supply port is communicated with a second chamber surrounded by the outer peripheral surface, the inner peripheral surface, and the ceiling surface of the second screen, and the second foreign substance outlet is communicated with a third chamber surrounded by the first screen, the inner peripheral surface of the second screen, and the ceiling surface of the rotary member.

In a preferred form, the surface of the rotary member which is opposed to the ceiling surface of the second screen is provided with a projection inclined in such a direction that prevents the papermaking material in the first chamber from flowing into the third chamber without passing through the second chamber.

According to another aspect of the present invention, there is provided a papermaking screen equipped with: a tank for holding a papermaking material, and having a papermaking material inlet, a screened material outlet, a first foreign substance outlet, and a second foreign substance outlet; a first screen which is provided in the tank and which partitions the interior of the tank into a primary compartment and a secondary compartment; a first stirrer provided outside the first screen; a second screen which is provided outside the first screen and which partitions the first primary compartment further into a first chamber and a second chamber; a second rotary member which is rotatably provided in the vicinity of the ceiling surface of the second screen; and a second stirrer provided outside the second screen; wherein the inlet and the first foreign substance outlet are communicated with the first chamber, the second foreign substance outlet is communicated with the second chamber, and the screened material outlet is communicated with the secondary compartment.

According to yet another aspect of the present invention, there is provided a papermaking screen equipped with: a tank for holding a papermaking material, and having a papermaking material inlet, a screened material outlet, a first foreign substance outlet, and a second foreign substance outlet; a cylindrical first screen which is provided in the tank, which partitions the interior of the tank into a primary compartment and a secondary compartment, and which has one open end thereof on the opposite side from a ceiling surface open; a first rotary member which is rotatably provided, and opposed to the ceiling surface of the first screen; a first stirrer which is suspended from the ceiling surface of the first rotary member and which is opposed to the outer side of the first screen; a cylindrical second screen which is provided outside the first screen, which partitions the primary compartment into a first chamber and a second chamber, and which has one end thereof on the opposite side from a ceiling surface; a second rotary member which is rotatably provided, and opposed to the ceiling surface of the second screen; and a second stirrer which is suspended from the ceiling surface of the second rotary member and which is opposed to the outer side of the second screen; wherein the meshes of the second screen are made larger than the meshes of the first screen, and the inlet and the first foreign substance outlet are communicated with the first chamber, the second foreign substance outlet is communicated with the second chamber, and the screened material outlet is communicated with the secondary compartment.

In a preferred form, the first rotary member and the second rotary member are attached to a rotary shaft which penetrates the ceiling surface of the first screen and the ceiling surface of the second screen.

In a further preferred form, the outer peripheral surface of the cylindrical first screen and the inner peripheral surface of the cylindrical second screen are partly opposed to each other.

DESCRIPTION OF THE PREFERRED EMBODIMENTS

Figure 1:
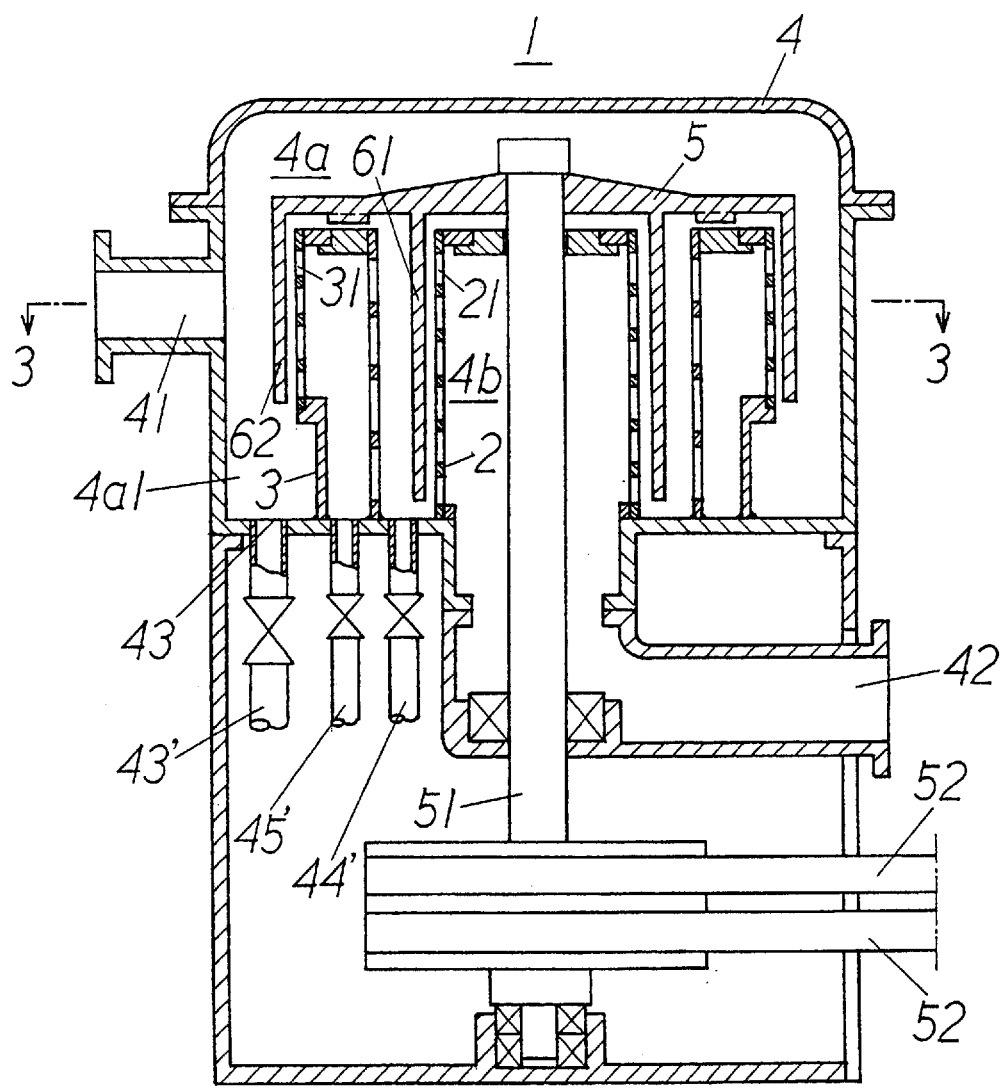
FIG. 1 is a schematic front sectional view of a papermaking screen of an embodiment in accordance with the present invention.

The papermaking screens of the embodiments in accordance with the present invention will be described with reference to the accompanying drawings.

Referring to FIG. 1 to FIG. 4, in a papermaking screen 1, a papermaking material, for example, flows from outside the screen to the inside thereof to screen the papermaking material. A second screen 3 and a first screen 2 for removing dust and foreign substances from the papermaking material are provided in a tank 4.

The tank 4 has an inlet 41 for a papermaking material, a screened material outlet 42, a first foreign substance outlet 43, a second foreign substance outlet 44, and a dilution water supply port 45; it stores a papermaking material to be processed.

The inlet 41 is connected to a material supply pipe which is not shown, and the screened material outlet 42 is connected to a second material discharge pipe which is not shown.

Connected respectively to the first foreign substance outlet 43, the second foreign substance outlet 44, and the dilution water supply port 45 are a first foreign substance discharge pipe 43', a second foreign substance discharge pipe 44', and a dilution water supply-discharge pipe 45'. The first foreign substance discharge pipe 43', the second foreign substance discharge pipe 44', and the dilution water supply-discharge pipe 45' are respectively provided with a first foreign substance discharge pipe on-off valve 43", a second foreign substance discharge pipe on-off valve 44", and a dilution water pipe on-off valve 45".

Further, the tank 4 is divided into a primary compartment 4a and a secondary compartment 4b by the cylindrical first screen 2. The cylindrical first screen 2 has; for example, a closed apex, an open bottom, and interstices 21 composed of round holes, slits, or the like in the side surface thereof; it is fixed to the tank 4 by a bolt or the like (not shown).

The second screen 3 is provided around the first screen 2; it is also fixed to the tank 4 by a bolt or the like (not shown).

The second screen 3 is equipped with an outer peripheral surface 32 having interstices 31 composed of round holes, slits, or the like which are larger than those of the interstices 21 of the first screen 2, and an inner peripheral surface 34 having a papermaking material port 33 for admitting the passage of a papermaking material, the apex of the inner peripheral surface 34 and the apex of the outer peripheral surface 32 being connected through a ceiling surface 35. In this embodiment, the ceiling surface 35 has been made as a discrete component and bonded to the adjacent parts, and the bonded portion is fixed; it is acceptable as long as the ceiling surface 35 serves to connect the apex of the inner peripheral surface 34 and the apex of the outer peripheral surface 32.

The interstices 31 of the second screen 3 are made larger than the interstices 21 of the first screen 2 so as to remove larger foreign substances by the second screen 3 and to remove smaller foreign substances by the first screen 2, thereby permitting efficient separation.

In the vicinity of the ceiling surface 35 of the second screen 3, a rotary member 5 is rotatably attached to, for example, a rotary shaft 51 connected to the center of the rotary member 5. The rotary shaft 51 is rotated by a motor, not shown, via a belt 52. Reference numeral 53 denotes a hole in which the rotary shaft 51 is inserted (see FIG. 4).

The rotary member 5 is equipped with a stirring unit for stirring a papermaking material in the primary compartment 4a.

The stirring unit is provided with, for example, a plurality of first stirrers 61 which are, for instance, suspended from the ceiling surface of the rotary member 5 and opposed to the outside of the first screen 2, and second stirrers 62 which are suspended from the ceiling surface of the rotary member 5 and opposed to the outside of the outer peripheral surface of the second screen 3.

The inlet 41 and the first foreign substance outlet 43 are communicated with a first chamber 4a1 which is in the primary compartment 4a and which is formed around the second screen 3; the dilution water supply port 45 is communicated with a second chamber 4a2 which is surrounded by the outer peripheral surface 32 and the inner peripheral surface 34 of the second screen and the ceiling surface 35; and the second foreign substance outlet 44 is communicated with a third chamber 4a3 surrounded by the first screen 2, the inner peripheral surface 34 of the second screen 3, and the ceiling surface of the rotary member 5.

As the second stirrers 62 turn around the second screen 3, the papermaking material in the first chamber 4a1 inevitably tries to flow into the third chamber 4a3 without passing through the second chamber 4a2.

Figure 2:
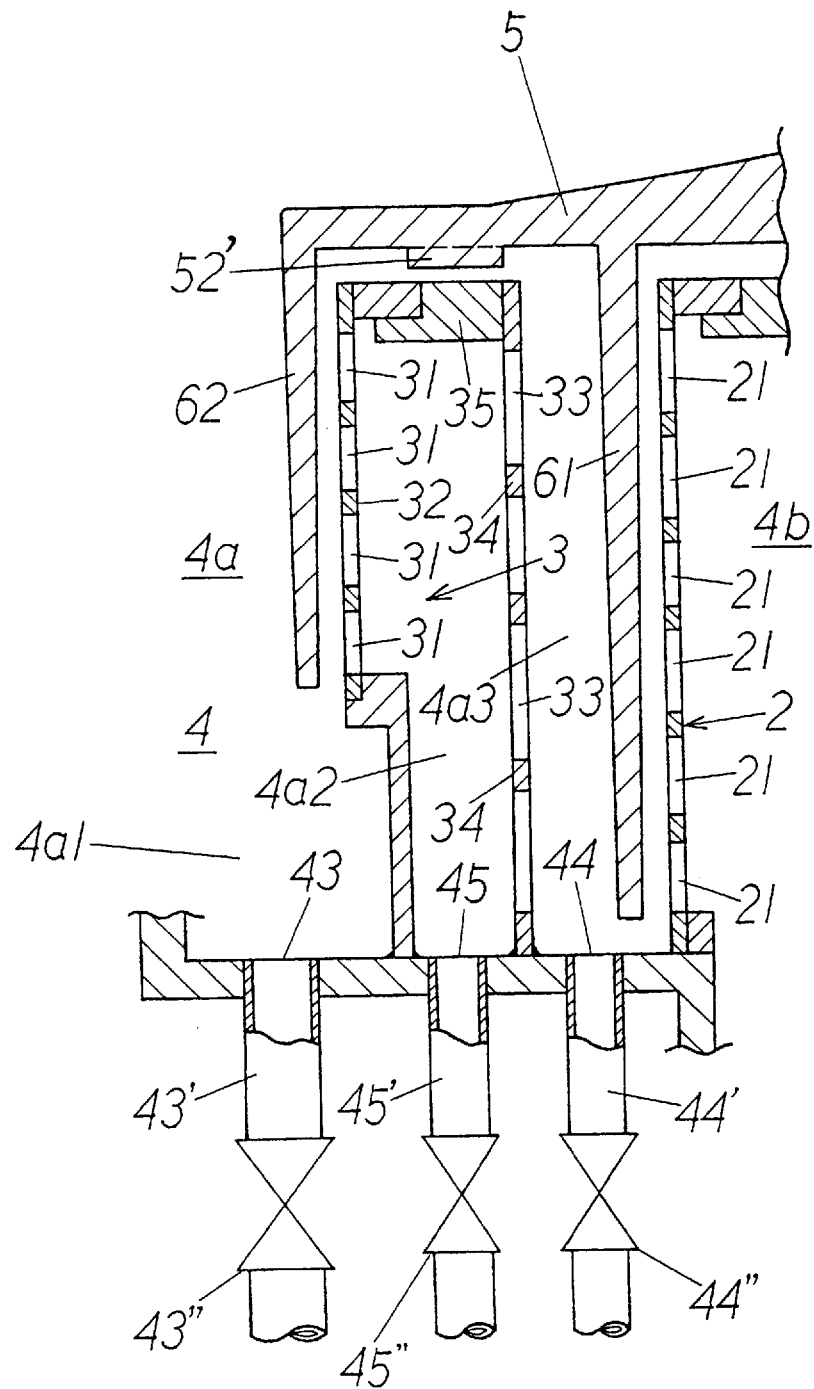
FIG. 2 is a schematic front sectional view, partly enlarged, of the papermaking screen shown in FIG. 1.
Figure 3:
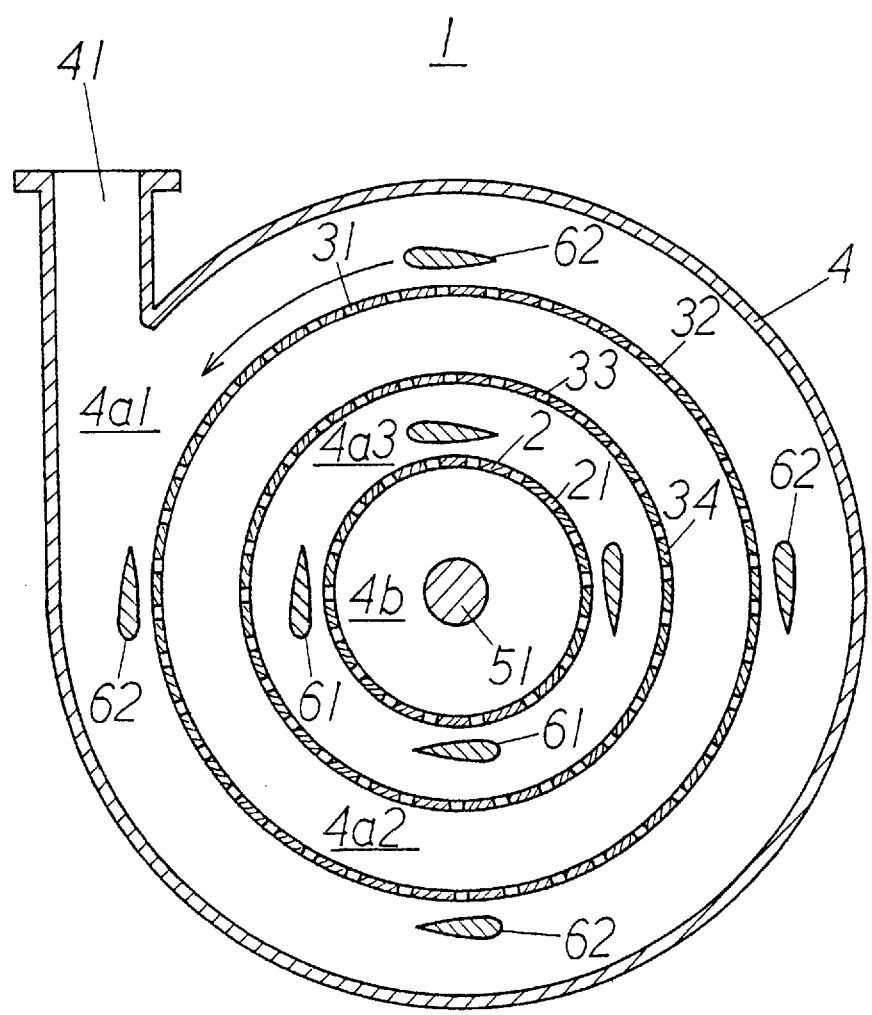
FIG. 3 is a schematic sectional view taken along lines 3—3 shown in FIG. 1, wherein the arrows indicate the rotational directions of a first stirrer and a second stirrer.
Figure 4:
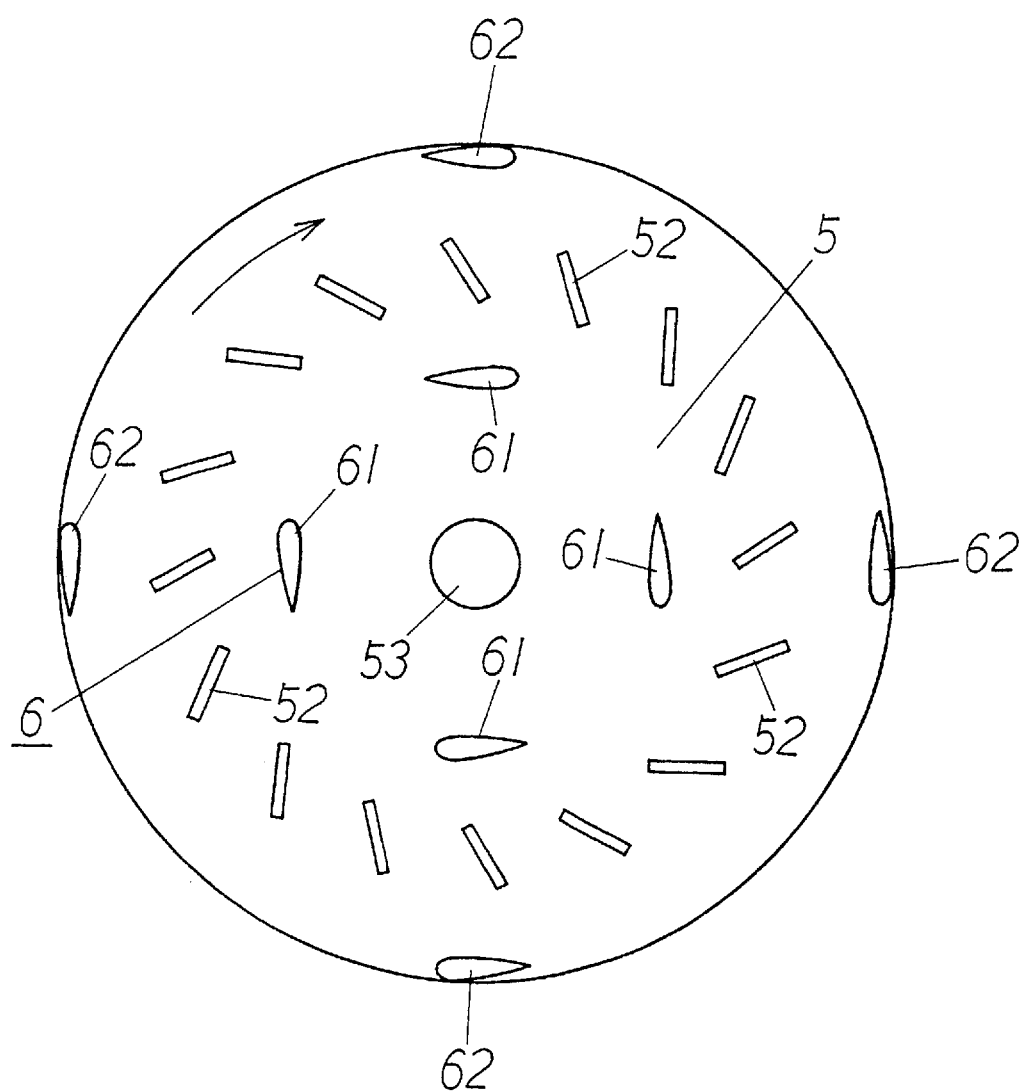
FIG. 4 is a schematic bottom view of a stirring member of FIG. 1 which is observed from the rear surface, wherein the arrows indicate the rotational direction of the stirring member.
Figure 5:
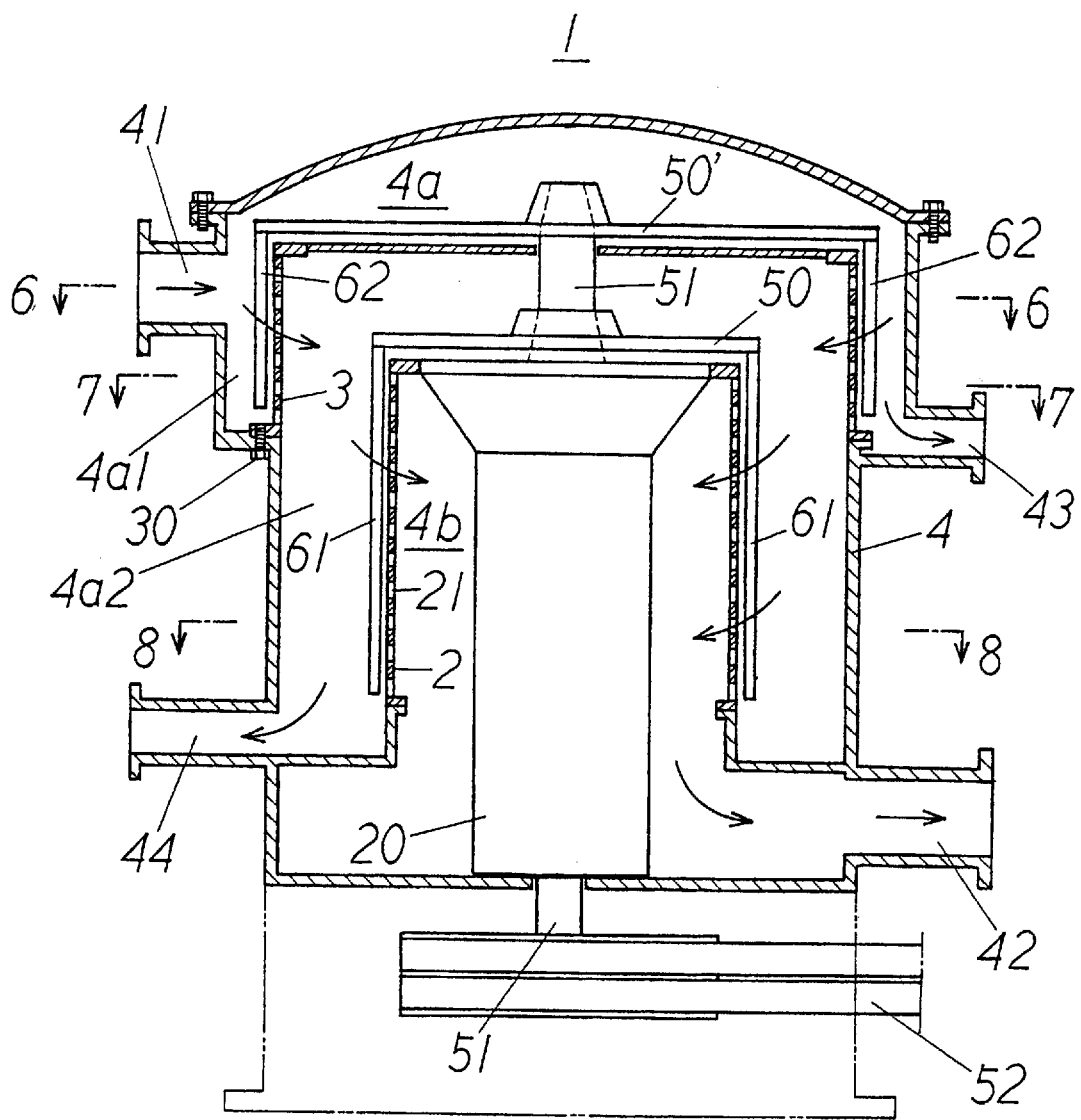
FIG. 5 is a schematic front sectional view of a papermaking screen of another embodiment which is different from the embodiment according to the present invention shown in FIG. 1.
Figure 6:
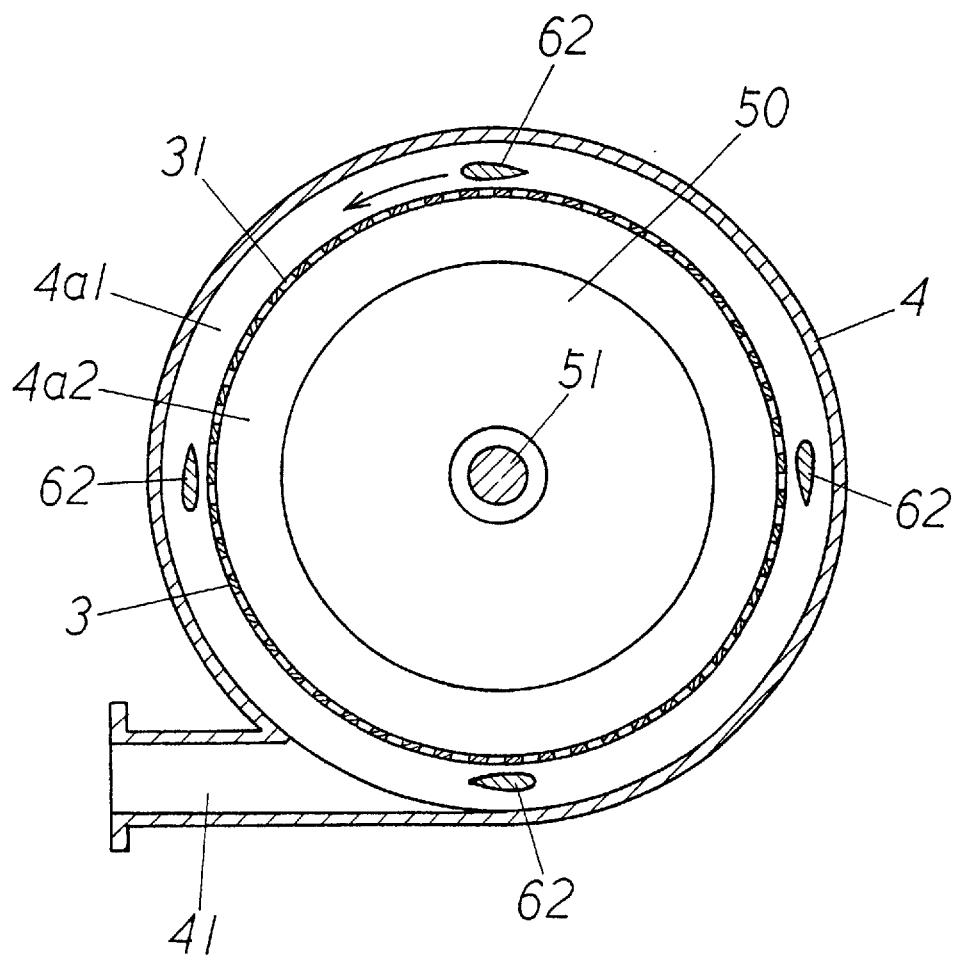
FIG. 6 is a schematic sectional view taken along lines 6—6 shown in FIG. 5, wherein the arrows indicate the rotational direction of the second stirrer.
Figure 7:
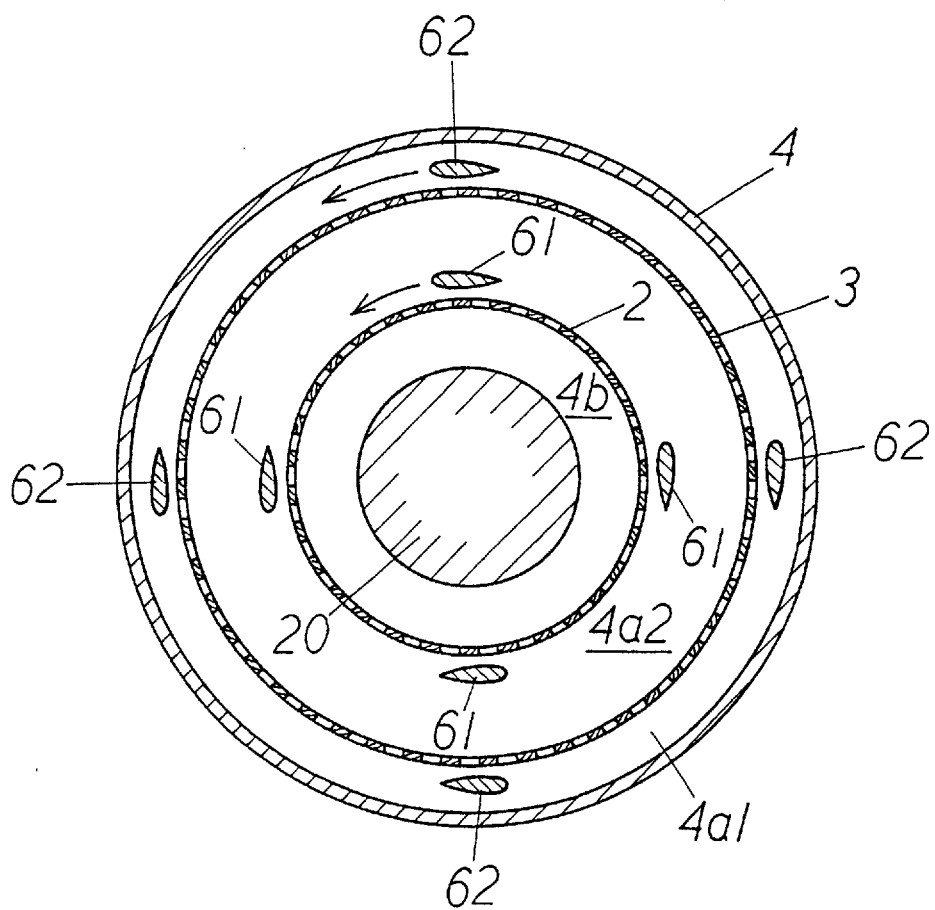
FIG. 7 is a schematic sectional view taken along lines 7—7 shown in FIG. 5, wherein the arrows indicate the rotational directions of the first stirrer and the second stirrer.
Figure 8:
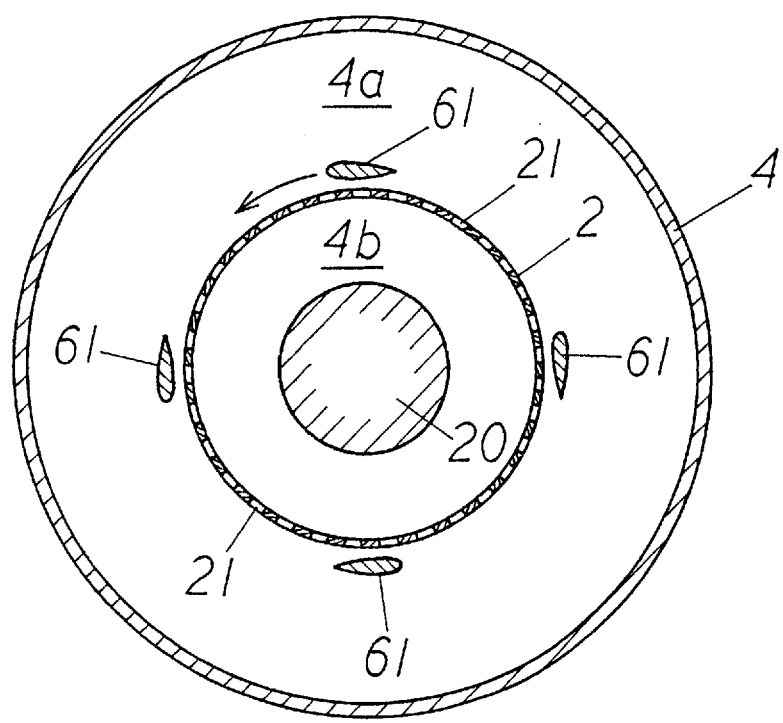
FIG. 8 is a schematic sectional view taken along lines 8—8 shown in FIG. 5, wherein the arrow indicates the rotational direction of the first stirrer.

In this embodiment, however, the surface of the rotary member 5 which is opposed to the ceiling surface of the second screen 3 is provided with a plurality of projection 52' which are inclined in such a direction that prevents the papermaking material in the first chamber 4a from flowing into the third chamber 4a3 without passing through the second chamber 4a2 (refer to FIG. 1, FIG. 2, and FIG. 4).

Hence, in the papermaking screen 1 shown in FIG. 1 through FIG. 4, when the rotary member 5 is rotating with the papermaking material introduced by a pump (not shown) in the first chamber 4a via a material supply pipe (not shown) and the inlet 41, the positive pressure and negative pressure are alternately applied by the second stirrers 62, which are provided opposite to the outside of the outer peripheral surface 32 of the second screen 3, to the second screen 3 and on the papermaking material inflow side of-the second screen 3. This makes it possible to generate sufficient pressure to make the useful fibers in the papermaking material pass through the interstices 31 of the second screen 3, the interstices being composed of round holes, slits, or the like.

Moreover, immediately after the second stirrers 62 pass by, the vicinity of the interstices 31 of the second screen 3 composed of round holes, slits, or the like is subject to negative pressure, so that the foreign substances adhering to the interstices 31 are removed by the backflow of the papermaking material from the acceptor side. Thus, useful fibers and foreign substances can be efficiently separated while preventing the second screen from clogging at the same time.

Further, the second stirrers 62 move around the second screen 3, so that the velocity of the papermaking material moving around the second screen 3 increases, thus permitting enhanced dust removing effect.

The papermaking material containing useful fibers which has been introduced into the second chamber 4a2 is led into the third chamber 4a3 via the papermaking material ports 33. The papermaking material containing useful fibers which has been introduced into the third chamber 4a3 is stirred by the first stirrers 61.

The useful fibers which have been separated by stirring are led into the secondary/compartment 4b through the interstices 21 and eventually led out of the tank 4 via the secondary compartment 4b and the screened material outlet 42.

The foreign substances in the first chamber 4a1 can be led out of the tank 4 for removal by opening, as necessary, the first foreign substance discharge pipe on-off valve 43" of the first foreign substance discharge pipe 43' connected to the first foreign substance outlet 43.

If the concentration of the papermaking material in the second chamber 4a2 is high, the concentration can be adjusted to a proper level by supplying water into the second chamber 4a2 by opening, as necessary, the dilution water pipe on-off valve 45" of the dilution water supply-discharge pipe 45' connected to the dilution water supply port 45.

Furthermore, the foreign substances in the third chamber 4a3 can be led out of the tank 4 to remove them by opening, as necessary, the second foreign substance discharge pipe on-off valve 44" of the second foreign substance discharge pipe 44' connected to the second foreign substance outlet 44.

The round holes or slits of the interstices 21 of the first screen 2 and those of the interstices 31 of the second screen 3 are mere examples; other types of interstices may be used as long as they are capable of separating useful fibers from foreign substances.

In the embodiment shown in FIG. 1 through FIG. 4 described above, the projections 52' are provided on the surface of the rotary member 5 which is opposed to the ceiling surface of the second screen 3 in order to prevent the papermaking material in the first chamber 4a1 from going into the third chamber 4a3 without passing through the second chamber 4a2.

There is still a possibility that the papermaking material in the first chamber 4a1 flows into the third chamber 4a3, skipping the second chamber 4a2, thus resulting in poor screening efficiency of the second screen 3.

The embodiment is also disadvantageous in that the second screen 3 has the papermaking material port 33, which admits the passage of the papermaking material, in the inner peripheral surface 34 in addition to the outer peripheral surface 32, thus adding to the manufacturing cost of the second screen 3. Further, the inner peripheral surface 34 need to be fixed in the tank 4, adding greatly to cumbersomeness in the manufacture, installation, etc.

The following embodiment will solve the problems mentioned above.

Referring to FIG. 5 through FIG. 9, a papermaking screen 1 of this embodiment is adapted, for example, to let a papermaking material to flow from outside to the inside of the screen so as to screen the papermaking material as in the case of the previous embodiment; it is provided with a first screen 2 and a second screen 3 in a tank 4 thereof.

The tank 4 has an inlet 41 for a papermaking material, a screened material outlet 42, a first foreign substance outlet 43, and a second foreign substance outlet 44; it stores a papermaking material to be processed.

The inlet 41 is connected to a material supply pipe which is not shown, the screened material outlet 42 is connected to a second material discharge pipe which is not shown, the first foreign substance outlet 43 is connected to a first foreign substance discharge pipe which is not shown, and the second foreign substance outlet 44 is connected to a second foreign substance discharge pipe which is not shown.

Further, the tank 4 is divided into a primary compartment 4a and a secondary compartment 4b by the first screen 2.

The first screen 2 is, for example, cylindrical and it has a closed ceiling surface, i.e. a closed apex, and an open bottom (the bottom which is on the opposite side from the ceiling surface is opened). The first screen 2 has interstices (screen meshes) 21 composed of round holes, slits, or the like in the side surface thereof; it is fixed to the tank 4 by a bolt or the like (not shown).

A guide cylinder 20 incorporates the bearing (not shown) for a rotary shaft 51; it supports the first screen 2 at the upper end thereof.

A second screen 3 is provided around the first screen 2. In the second screen 3, the primary compartment 4a is divided into a first chamber 4a1 and a second chamber 4a2. The second screen 3 is, for example, cylindrical, and it has a closed ceiling surface, i.e. a closed apex, and an open bottom (the bottom which is on the opposite side from the ceiling surface is opened). The second screen 3 has interstices (screen meshes) 31 composed of round holes, slits, or the like in the side surface thereof; it is fixed to the tank 4 by a bolt 30.

Figure 9:
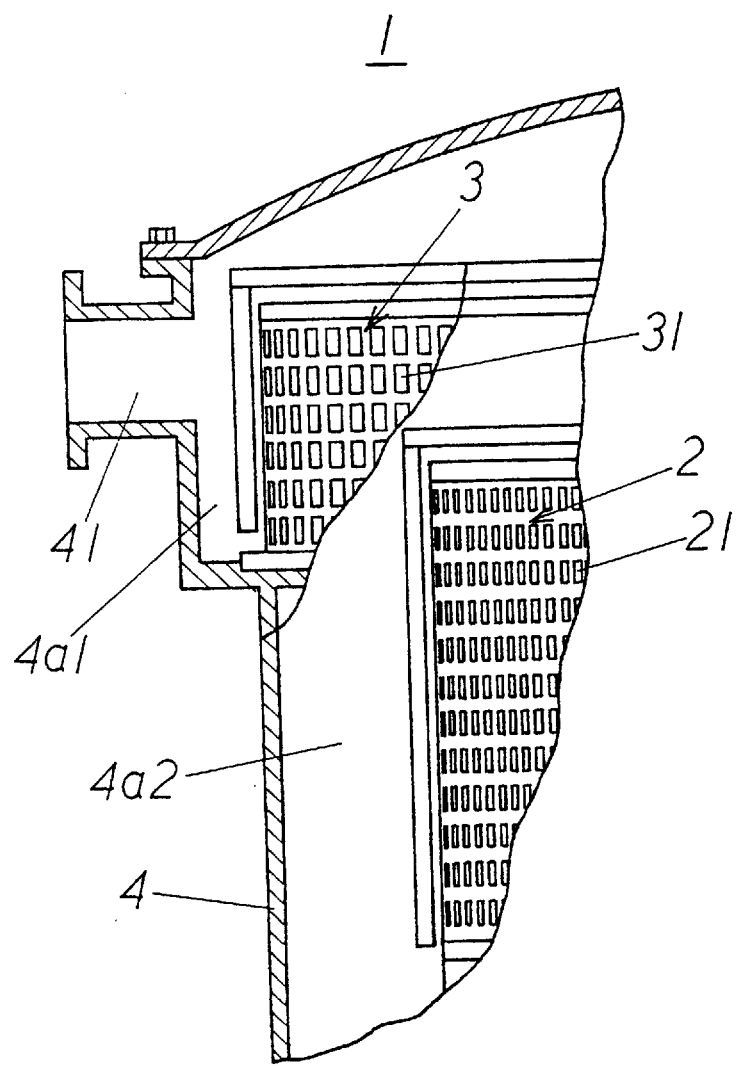
FIG. 9 is a partial cutaway view of the papermaking screen shown in FIG. 5, illustrating the size of the meshes of a second screen and the size of the meshes of a first screen.
Figure 10:
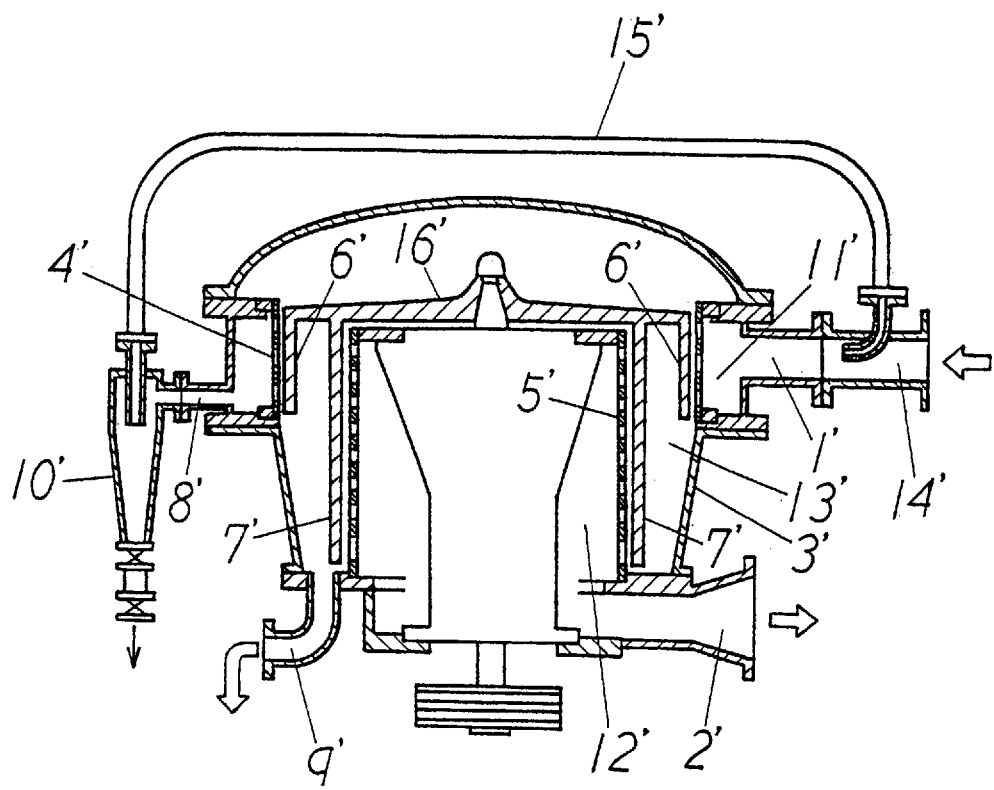
FIG. 10 is a schematic front sectional view of a conventional papermaking screen.

The second screen 3 has interstices (screen mesh) 31 composed of round holes, slits, or the like which are larger than the interstices (screen mesh) 21 of the first screen 2 (see FIG. 9).

The interstices (screen mesh) 31 of the second screen 3 are made larger than the interstices (screen mesh) 21 of the first screen 2 so as to remove larger foreign substances by the second screen 3 and to remove smaller foreign substances by the first screen 2, thereby permitting efficient separation.

A first rotary member 50 (e.g. a discoid member) is rotatably provided so that it is opposed to the ceiling surface of the first screen 2.

There are also provided, for example, a plurality of (four vane-type agitators in this embodiment) first stirrers 61 for stirring the papermaking material in the second chamber 4a2, which are opposed to the outside of the first screen 2 and which are suspended from the ceiling surface of the first rotary member 50.

Further, a second rotary member 50' (e.g. a discoid member) is rotatably provided so that it is opposed to the ceiling surface of the second screen 3.

There are also provided, for example, a plurality of (four vane-type agitators in this embodiment) second stirrers 62 for stirring the papermaking material in the first chamber 4a1, which are opposed to the outside of the second screen 3 and which are suspended from the ceiling surface of the second rotary member 50'.

The first rotary member 50 and the second rotary member 50' are attached to a rotary shaft 51 penetrating the ceiling surface of the first screen 2 and the ceiling surface of the second screen 3 in such a manner that the second rotary member 50' is positioned higher than the first rotary member 50.

The rotary shaft 51 is rotated via a belt 52 driven by a motor which is not shown.

The inlet 41 and the first foreign substance outlet 43 are communicated with the first chamber 4a1, the second foreign substance outlet 44 is communicated with the second chamber 4a2, and the screened material outlet 42 is communicated with the secondary compartment 4b.

Accordingly, in the papermaking screen 1 shown in FIG. 5 through FIG. 9, when the first rotary member 50 and the second rotary member 50' are rotating with the papermaking material introduced by a pump (not shown) in the first chamber 4a via a material supply pipe (not shown) and the inlet 41, positive pressure and negative pressure are alternately applied by the second stirrers 62, which are provided opposite to the outside of the second screen 3, to the second screen 3 and on the papermaking material inflow side of the second screen 3. This makes it possible to generate sufficient pressure to make the useful fibers in the papermaking material pass through the interstices 31 of the second screen 3 composed of round holes, slits, or the like.

Moreover, immediately after the second stirrers 62 pass by, the area in the vicinity of the interstices 31 of the second screen 3 composed of round holes, slits, or the like is subject to negative pressure, so that the foreign substances adhering to the interstices 31 are removed by the backflow of the papermaking material from the acceptor side. Thus, useful fibers and foreign substances can be efficiently separated while preventing the second screen 3 from clogging at the same time.

Further, the second stirrers 62 move around the second screen 3, so that the velocity of the papermaking material moving around the second screen 3 increases, permitting enhanced dust removing effect.

The papermaking material containing useful fibers which has been introduced into the second chamber 4a2 is stirred by the first stirrers 61. The useful fibers which have been separated by stirring go through the interstices 21 and they are eventually led out of the tank 4 via the secondary compartment 4b and the screened material outlet 42.

The foreign substances in the first chamber 4a1 can be led out of the tank 4 to remove it via a first foreign substance discharge pipe (not shown) connected to the first foreign substance outlet 43. Likewise, the foreign substances in the second chamber 4a2 can be led out of the tank 4 to remove it via a second foreign substance discharge pipe (not shown) connected to the second foreign substance outlet 44.

Thus, according to this embodiment, the second screen 3 is provided around the first screen 2, and the primary compartment 4a is divided into the first chamber 4a1 and the second chamber 4a2; and the first screen 2 accepts the papermaking materials which have passed through the second screen 3. This permits higher screening efficiency of the first screen 2.

The second screen 3 obviates the need of the inner peripheral surface 34 as in the case of the previous embodiment illustrated in FIG. 1 through FIG. 4, thus enabling lower manufacturing cost than that required by the papermaking screen of-the embodiment shown in FIG. 1 through FIG. 4. It is obviously not necessary to fix the inner peripheral surface 34 in the tank 4, permitting easier, quicker manufacturing and installation of the second screen 3.

Furthermore, the outer peripheral surface of the cylindrical first screen 2 and the inner peripheral surface of the cylindrical second screen 3 are partially opposed (see FIG. 7); therefore, the height of the papermaking screen 1 can be reduced.

As in the case of the embodiment shown in FIG. 1 through FIG. 4, the round holes or slits of the interstices 21 of the first screen 2 and those of the interstices 31 of the second screen 3 are mere examples in this embodiment also; other types may be used for the interstices 21 and the interstices 31 as long as they are capable of separating useful fibers from foreign substances.

Thus, according to one aspect of the present invention described above, the positive pressure and negative pressure are alternately applied by the second stirrers, which are provided opposite to the outside of the outer peripheral surface of the second screen, to the second screen and on the papermaking material inflow side of the second screen. This makes it possible to generate sufficient pressure to make the papermaking material pass through the interstices of the second screen, the interstices being composed of round holes, slits, or the like.

Moreover, immediately after the second stirrer 62 pass by, the area in the vicinity of the second screen which interstices are composed of round holes, slits, or the like is subject to negative pressure, so that the foreign substances adhering to the interstices are removed by the backflow of the papermaking material from the acceptor side. Thus, useful fibers and foreign substances can be efficiently separated while preventing the second screen from clogging at the same time.

Further, the second stirrers move around the second screen, so that the velocity of the papermaking material moving around the second screen increases, permitting enhanced dust removing effect.

According to another aspect of the present invention described above, in addition to the advantages provided by the aforesaid aspect of the present invention, the projections are provided on the surface of the rotary member which are opposed to the ceiling surface of the second screen in order to prevent the papermaking material in the first chamber from entering into the third chamber without passing through the second chamber. Therefore, it is possible to prevent the papermaking material in the first chamber from entering into the third chamber without passing through the second chamber as the second stirrers rotate around the second screen.

According to yet another aspect of the present invention, the positive pressure and negative pressure are alternately applied by the second stirrers, which are provided around the second screen, to the second screen and on the papermaking material inflow side of the second screen. This makes it possible to generate sufficient pressure to make the papermaking material pass through the meshes of the second screen.

Moreover, immediately after the second stirrers pass by, the area in the vicinity of the meshes of the second screen is subject to negative pressure, so that the foreign substances adhering to the meshes are removed by the backflow of the papermaking material from the acceptor side. Thus, useful fibers and foreign substances can be efficiently separated while preventing the second screen from clogging at the same time.

Further, the second stirrers move around the second screen, so that the velocity of the papermaking material moving around the second screen increases, thus permitting enhanced dust removing effect.

In the embodiment illustrated in FIG. 1 through FIG. 4, the surface of the rotary member 5 which is opposed to the ceiling surface of the second screen 3 is provided with the projections 52' to prevent the papermaking material in the primary compartment 4a from flowing into the third chamber 4a3 without passing through the second chamber 4a2; however, there is still a possibility that the papermaking material in the primary compartment 4a flows into the third chamber 4a3, skipping the second chamber 4a2. In the embodiment illustrated in FIG. 5 through FIG. 9, the second screen is provided around the first screen, the primary compartment is divided into the first chamber and the second chamber, and the first screen accepts the papermaking material which has passed through the second screen, thereby permitting higher screening efficiency of the second screen.

In the embodiment shown in FIG. 1 through FIG. 4, the second screen 3 has the papermaking material port 33 in the inner peripheral surface 34 in addition to the outer peripheral surface 32. This adds to the manufacturing cost of the second screen 3 and it also requires that the inner peripheral surface 34 be fixed in the tank 4.

The embodiment shown in FIG. 5 through FIG. 9 obviates the need of the inner peripheral surface 34 of the aforesaid embodiment shown in FIG. 1 through FIG. 4, enabling lower manufacturing cost than that of the embodiment shown in FIG. 1 through FIG. 4 and also eliminating the need for fixing the inner peripheral surface in the tank. Thus, the second screen can be manufactured and installed more easily and quickly.

Further, the outer peripheral surface of the cylindrical first screen and the inner peripheral surface of the cylindrical second screen are partially opposed, so that the height of the papermaking screen can be reduced.

What is claimed is:

1. A papermaking screen apparatus comprising:
   a tank for holding a papermaking material, said tank having a papermaking material inlet at a peripheral portion and a screened material outlet for removing a screened material from a center portion of the tank,
   a cylindrical first screen situated inside the tank to form an inner compartment therein connected to the screened material outlet,
   a cylindrical second screen situated inside the tank and located outside the first screen to thereby form an outer chamber between an inner periphery of the tank and the second screen and an inner chamber between the first and second screens, said second screen being at least partly overlapped with the first screen along an axial direction and said outer chamber communicating with the papermaking material inlet to receive the papermaking material, and
   a stirring unit rotatably situated inside the tank and including a first stirrer situated in the inner chamber adjacent to the first screen, and a second stirrer situated in the outer chamber adjacent to the second screen so that when the papermaking material is supplied from the papermaking material inlet and the first and second stirrers are rotated, the papermaking material passes through the first and second screens and flows radially inwardly of the tank to be discharged from the screened material outlet through the inner compartment.

2. A papermaking screen apparatus according to claim 1, wherein said first stirrer is located outside the first screen at an upstream side of a flow of the papermaking material relative to the first screen so that a centrifugal force of the papermaking material formed by the first stirrer is not applied to the first screen, and the second stirrer is located outside the second screen at the upstream side of the flow relative to the second screen.

3. A papermaking screen apparatus according to claim 2, further comprising a first foreign substance outlet connected to the outer chamber, and a second foreign substance outlet connected to the inner chamber to remove foreign substances contained in the papermaking material and blocked by the first and second screens, respectively.

4. A papermaking screen apparatus according to claim 3, wherein said first screen has a closed ceiling to allow the papermaking material passing through the first screen to be discharged directly to the screened material outlet.

5. A papermaking screen apparatus according to claim 3, wherein said second screen has an outer peripheral surface, an inner peripheral surface and an intermediate chamber between the outer and inner peripheral surfaces.

6. A papermaking screen apparatus according to claim 5, further comprising a dilution water supply port communicating with the intermediate chamber to supply water thereto.

7. A papermaking screen apparatus according to claim 6, wherein said stirring unit further includes a rotary member disposed above the first and second screens, said rotary member having projections extending toward the second screen and inclining in a direction to prevent the papermaking materials in the outer chamber from flowing toward the inner chamber.

* * * * *